(12) United States Patent
Gallagher et al.

(10) Patent No.: US 7,415,136 B2
(45) Date of Patent: Aug. 19, 2008

(54) OPTICAL METHOD AND SYSTEM FOR RAPID IDENTIFICATION OF MULTIPLE REFRACTIVE INDEX MATERIALS USING MULTISCALE TEXTURE AND COLOR INVARIANTS

(75) Inventors: Scott M. Gallagher, North Falmouth, MA (US); Sanjay Tiwari, Teaticket, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 763 days.

(21) Appl. No.: 11/009,693

(22) Filed: Dec. 10, 2004

(65) Prior Publication Data

US 2005/0126505 A1 Jun. 16, 2005

Related U.S. Application Data

(60) Provisional application No. 60/528,965, filed on Dec. 10, 2003.

(51) Int. Cl.
*G06K 9/00* (2006.01)
(52) U.S. Cl. ...................... 382/110; 119/234
(58) Field of Classification Search ................ 382/110, 382/133, 160; 356/16, 24, 29, 38, 43, 127, 356/128, 131, 133, 330, 368, 436, 437, 481, 356/504, 517; 359/246, 281, 301, 303, 304, 359/332, 371; 435/6, 7.9; 530/350, 389.1; 536/22.1, 23.1, 24.1, 25.1; 119/234
See application file for complete search history.

(56) References Cited

U.S. PATENT DOCUMENTS 5,548,395 A * 8/1996 Kosaka .................. 356/73

6,548,263 B1 * 4/2003 Kapur et al. ................ 506/32

OTHER PUBLICATIONS

E. D. Garland et al., "Techniques for the Identification of Bivalve Larvae", Marine Ecology Progress Series, 225:299-310 (2002).

(Continued)

*Primary Examiner*—Abolfazl Tabataba
(74) *Attorney, Agent, or Firm*—R. Dennis Creeham, Esq.

(57) ABSTRACT

An innovative optical system and method is disclosed for analyzing and uniquely identifying high-order refractive indices samples in a diverse population of nearly identical samples. The system and method are particularly suitable for ultra-fine materials having similar color, shape and features which are difficult to identify through conventional chemical, physical, electrical or optical methods due to a lack of distinguishing features. The invention discloses a uniquely configured optical system which employs polarized sample light passing through a full wave compensation plate, a linear polarizer analyzer and a quarter wave retardation plate for producing vivid color bi-refringence pattern images which uniquely identify high-order refractive indices samples in a diverse population of nearly visually identical samples. The resultant patterns display very subtle differences between species which are frequently indiscernable by conventional microscopy methods. When these images are analyzed with a trainable with a statistical learning model, such as a soft-margin support vector machine with a Gaussian RBF kernel, good discrimination is obtained on a feature set extracted from Gabor wavelet transforms and color distribution angles of each image. By constraining the Gabor center frequencies to be low, the resulting system can attain classification accuracy in excess of 90% for vertically oriented images, and in excess of 80% for randomly oriented images.

7 Claims, 7 Drawing Sheets

OTHER PUBLICATIONS

X. Tang et al., "Automatic Plankton Image Recognition", Artificial Intelligence Review, vol. 12(1-3):177-199.

G. D. Finlayson et al., "Color Angular Indexing", Proc. 4th Europ. Conf. Computer Vision, vol. II, pp. 16-27.

G. M. Haley et al., "Rotation-Invariant Texture Classification Using a Complete Space-Frequency Model", IEEE Trans. Image Processing, vol. 8(2):255-269 (Feb. 1999).

L. Lucchese et al., "Color Segmentation Through Independent Anisotropic Diffusion of Complex Chromaticity and Lightness", Proc. IEE Int. Conf. Vision, Image and Signal Processing, vol. 148(3):141-150 (Jun. 2001).

B. S. Manjunath et al., "Texture Features for Browsing and Retrieval of Image Data", IEEE Trans. Pattern Analysis and Machine Intelligence, vol. 18(8): 837-842 (Aug. 1996).

E. Osuna et al., "Training Support Vector Machines: An Application to Face Detection", 1997 IEEE Computer Society Conference on Computer Vision and Pattern Recognition Proceedings (San Juan, PR),Jun. 17-19, 1997, pp. 130-136.

O. Chapelle et al., "Support Vector Machines for Histogram-Based Image Classification", IEEE Trans. Neural Networks, 10(5):1055-1064 (Sep. 1999).

M. Pontil et al., "Support Vector Machines for 3-D Object Recognition", IEEE Trans. Pattern Analysis and Machine Intelligence, 20:637-646 (1998).

M. J. Swain et al., "Color Indexing", International Journal of Computer Vision, 7(1):11-32 (1991).

J. F. C. Wanderly et al., "Multiscale Color Invariants Based on the Human Visual System", IEEE Transaction on Image Processing, 10(11):1630-1638 (Nov. 2001).

G. Van de Wouwer et al., "Rotation-Invariant Texture Segmentation Using Continuous Wavelets", IEEE UK Conf. Applications of Time Frequency and Time Scale Methods, TFTS '97 Proceedings, Sep. 1997 (Warick, UK), pp. 129-132.

* cited by examiner

Imaging Scallop Larvae using Optical Polarization

OPTICAL METHOD AND SYSTEM FOR RAPID IDENTIFICATION OF MULTIPLE REFRACTIVE INDEX MATERIALS USING MULTISCALE TEXTURE AND COLOR INVARIANTS

CROSS-REFERENCES

This application claims the benefit under 35 U.S.C. 119(e) of co-pending U.S. provisional patent application U.S. Ser. No. 60/528,965 filed on Dec. 10, 2003 which is incorporated herein by this reference.

FIELD OF THE INVENTION

This invention relates generally to a rapid, non-destructive, real-time method and system for identifying and classifying sample materials having high order refractive indices. More particularly, this invention relates to an optical system and method for generating color interference images of micron-sized high-order refractive indices biological specimens and analyzing calculated multi-scale texture and color invariants with a statistical learning model for identifying and classifying specific species in a diverse population of species.

BACKGROUND OF THE INVENTION

Adult sea scallops reproduce by freely releasing gametes into the water column where larvae swim and develop for a period of about 50 days. Normally, larvae ready to settle find a likely spot on the bottom and begin to develop into the juvenile form. This newly settled stage is called "spat" which can attain size of 1 cm within a few weeks. It has been shown in countries such as Japan that commercially important sea scallop stocks may be greatly enhanced and managed through the practice of spat collection. Meshed bags or collectors are placed in regions where larvae are naturally concentrated, the larvae settle on the collectors and quickly develop into spat. The spat are then relayed into protected grow-out areas where fishing pressure is eliminated. After 1 to 2 years, the adult scallops are harvested using normal bottom trawling techniques.

Knowledge of the population dynamics of bivalves such as clams, oysters, and scallops is required to effectively management these commercially important shellfish resources. A major stumbling block to understanding bivalve population dynamics has been identification of the planktonic, and very small (order 100 microns) larvae. For years researches have searched for distinguishing, species-specific features for identifying larvae. Although scanning electron microscopy (SEM) is regarded as the most reliable approach for feature identification, the technique is very laborious requiring days to process just a few larvae. The optical approach to larval identification described here lends itself to non-destructive, rapid, flow-through optical systems where hundreds of larvae could be identified in seconds. When put into use on research vessels, this approach could greatly enhance our ability to map abundance and distribution of bivalve larvae in the world ocean and allow researchers to make rapid predictions of where the ocean currents will carry the larvae before settlement on the bottom. Resource managers require this kind of information before attempting to establish effective management plans.

Many bivalve mollusks produce planktonic larvae which progress through a series of developmental stages before settling to the bottom and taking up a benthic existence. All bivalve mollusks have larvae which progress through a series of developmental stages: fertilization of the egg, gastrulation, trochophore stage, prodissochonch I stage, prodissochonch II stage, and dissochonch stage. Mineralization of the prodissochonch I shell begins about 20 h after fertilization in an area of the trochophore larva called the shell field invagination (SFI), which consists of a proteinacous organic matrix. Optical orientation of the bi-refringent aragonitic crystals, which nucleate and grow on the organic matrix, is controlled by protein organization within the organic matrix. Under polarized light, the prodissochonch I shell exhibits a dark cross of full light extinction where the optic axes of the two polarizing filters are normal to one another demonstrating that crystal orientation is arranged radially around the SFI. The mode of shell deposition makes a transition between prodissoconch I/II formation as crystals are added to the ventral margins of the shell with an orientation relative to the previous layer. This process continues for about 30 days until the prodissochonch II shell is fully formed and the larva is ready to metamorphose into the dissoconch stage. The prodissoconch I/II boundary is clearly viewed under polarized light extending radially around the shell at a distance of about 100 microns from the SFI.

Since bivalve larvae are typically about 100 um in size, larvae species appear nearly identical upon conventional polarized light microscopy examination. A recent review of current identification techniques has been provided by Garland and Zimmer (E. D. Garland and C. A. Zimmer, Mar. Ecol. Prog. Ser., 225:299-310 (Jan. 11, 2002). Attempts to identify bivalve larvae based on their morphology such as shell shape (Chanley and Andrews, 1971; Loosanoff et al. 1966; Miyazaki, 1962; Rees, 1950; Stafford, 1912) or denticular structures (Le Pennec, 1980; Lutz et al. 1982) has been shown to be extremely, difficult, time consuming, and inaccurate. Use of the scanning electron microscope to identify denticular structures improves identification accuracy, but is extremely time consuming requiring hours to days for sample preparation and observation (Fuller et al. 1993; Lutz and Jablonski, 1979). More recently, a limited number of attempts to identify bivalve larvae to species have been made using molecular techniques (Bell and Grassle, 1997; 1998; Coffroth and Mulawka, 1995; Demers et al. 1993; Hu et al. 1992), but these are highly inaccurate, time consuming, and completely destructive to the individual. Thus, despite years of research we do not have the ability to accurately, repeatedly, and quickly identify scallop larvae from the plankton.

What is currently needed is a system and method for rapid identification of scallop and other bivalve larvae in the field using instrumentation on ships of opportunity where data can be immediately telemetered to shore, assimilated into physical models, and results made available on a daily basis to commercial fishermen.

SUMMARY OF THE INVENTION

An innovative optical system and method is disclosed for analyzing and uniquely identifying high-order refractive indices samples in a diverse population of nearly identical samples. The system and method are particularly suitable for ultra-fine materials having similar color, shape and features which are difficult to identify through conventional chemical, physical, electrical or optical methods due to a lack of distinguishing features. The invention discloses a uniquely configured optical system which employs polarized sample light passing through a full wave compensation plate, a linear polarizer analyzer and a quarter wave retardation plate for producing vivid color bi-refringence pattern images which uniquely identify high-order refractive indices samples in a diverse population of nearly visually identical samples. The resultant patterns display very subtle differences between species which are frequently indiscernable by conventional microscopy methods. When these images are analyzed with a trainable with a statistical learning model, such as a soft-margin support vector machine with a Gaussian RBF kernel, good discrimination is obtained on a feature set extracted from Gabor wavelet transforms and color distribution angles of each image. By constraining the Gabor center frequencies to be low, the resulting system can attain classification accuracy in excess of 90% for vertically oriented images, and in excess of 80% for randomly oriented images. The identification technique described herein is accurate, completely non-destructive and can be accomplished rapidly in real-time for large sample populations.

In one particularly useful embodiment, the present invention discloses a novel image acquisition and processing system and method involving application of support vector machines and multiscale texture and color invariants to a classification problem in biological oceanography, the identification of species of bivalve larvae in a sample population. The innovative system and method have been used to identify specific species of marine bivalve larvae within a sample having a diverse population of nearly identical species. Larval shells typically become birefringent once they are mineralized with aragonitic crystals which nucleate and grow on an organic matrix. Crystal optical orientation is controlled by protein organization within the matrix.

Under polarized light, such larval shells exhibit light extinction where the optic axes of the two polarizing filters are normal to one another demonstrating that crystal orientation is arranged radially around the location of nucleation. By employing the innovative optical component configuration as disclosed herein, distinct colored interference patterns are produced as the polarized light travels through the bi-refringent crystals, combines and cancels. Each color represents the degree of axial rotation of the crystal at that location with the color pattern repeating in each 90 degree quadrant. Because of the unique protein compliment each bivalve species uses to form the organic matrix, crystal axial rotation and, therefore, the color pattern produced under polarized light is also unique to that species. Species-specific differences in the color pattern can be striking and easily discernable, but in general are too subtle for human observation or conventional instrumentation to detect, thereby requiring sophisticated statistical approaches, such as support vector machine analysis, to detect and quantify subtle differences for classifying various species.

While larvae of scallops, clams, and oysters are rather small (100 microns) with few distinguishing features when observed with conventional microscopy methods, the use of the innovative optical configuration of the present invention, which employs polarized light with a full wave compensation plate, polarizer analyzer and quarter wave retardation plate, produces a vivid color, bi-refringence pattern image. These images display very subtle differences between species, often not discernable to human observers. By analyzing these images with a trainable computer-based statistical model, good discrimination is achieved on a feature set extracted from Gabor wavelet transforms and color distribution angles of each image.

While examples are provided herein for analysis and classification of marine bivalve larvae, due to the novel configuration trainable statistical models, such as of optical system components and application of a soft-margin support vector machine, the disclosed invention is particularly useful for the rapid, accurate identification and classification of virtually any samples that have high order refractive indices.

BRIEF DESCRIPTION OF THE DRAWINGS

This invention is pointed out with particularity in the appended claims. Other features and benefits of the invention can be more clearly understood with reference to the specification and the accompanying drawings in which:

DESCRIPTION OF THE PREFERRED EMBODIMENTS

A. Background

Figure 1:
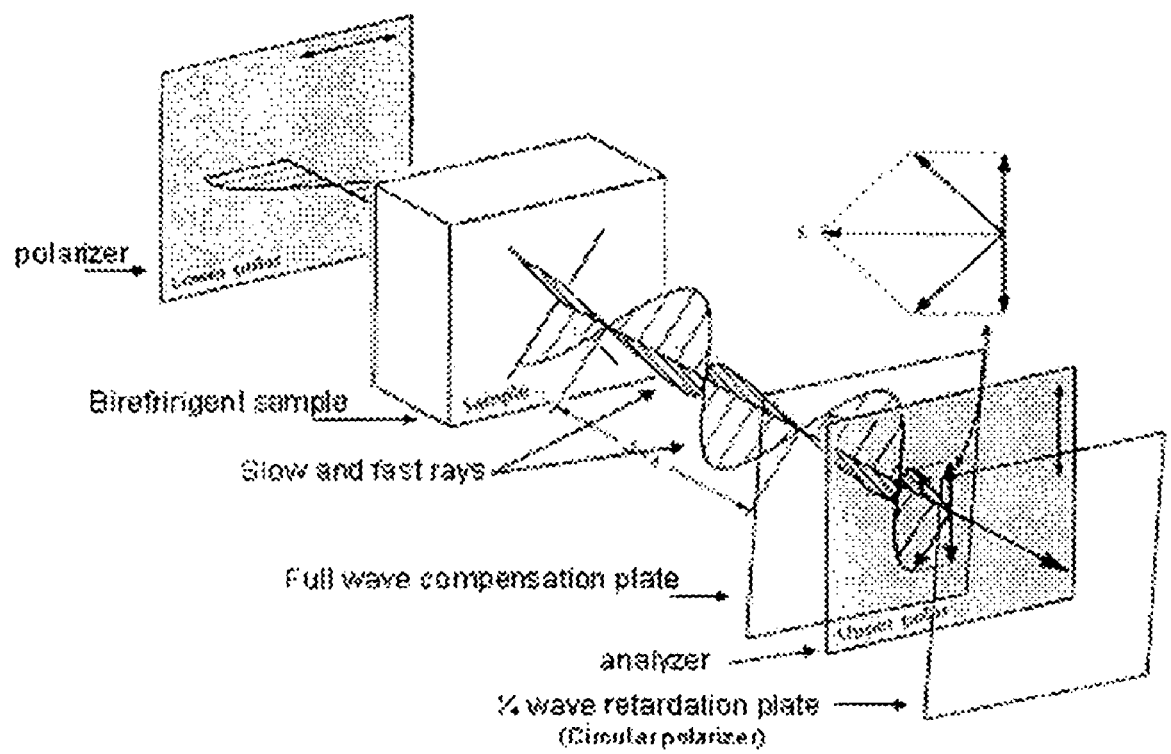
FIG. 1 is a schematic of a birefringent sample transmitted light path passing through the innovative optical component configuration of the present invention.

Identification of bivalve larvae such as clams, oysters, and scallops is required to effectively manage these commercially important shellfish resources. For years researchers have searched for distinguishing, species-specific features for identifying larvae. Although scanning electron microscopy (SEM) is regarded as the most reliable approach for feature identification, the technique is very laborious requiring days to process just a few larvae. The optical approach to larval identification described herein lends itself to non-destructive, rapid, flow-through optical systems where hundreds of larvae could be identified in seconds. The imaging system disclosed herein may be employed on research vessel and ships of opportunity to enable sampling and mapping of the abundance and distribution of bivalve larvae in the world ocean and provides for the capability to make rapid predictions of where the ocean currents will carry the larvae before settlement on the bottom.

B. Technical Approach

The inputs for the disclosed pattern recognition system are polarized color images of the six species. Since the problem of species recognition is complicated by the variation within a species, a good classifier has to have enough flexibility to accommodate this intra-species variation, while still working efficiently to capture inter-species variation. These images are so alike that trained marine biologists cannot identify them with greater than 50% accuracy. In fact, since we cannot independently identify larvae from the ocean with accuracy, specimens for the training set must be raised in mono-cultures in the lab. Thus, an automated identification system is not an aid, but an essential need. The performance of the classifier also depends on how accurately the feature sets capture species-related features. We show that a soft margin Support Vector Machine applied to feature sets constructed from Gabor transforms and color angles of the images, performs this task with classification accuracy of over 90% when the images are presented in a vertical orientation (as a result of preprocessing) and over 80% when the images are presented in random orientations. In the following sections, we first review the optical principles underlying the innovative device and method of the present invention. Then the optical system hardware is described followed by a review of the analytical approach and method employed to identify and classify high refractive indices samples including, Support Vector Machines (SVMs), texture feature sets which are constructed from Gabor wavelet transforms of different components of a color image and the rotation-invariant features derived from these, color feature sets which use the elegant construction of the color distribution angles and novel standard deviation color indices. Finally, SVM training and classification methods are described by employing various examples of texture and color feature sets for identifying and classifying high-order refractive index materials, such as bivalve larvae species, in a diverse population of similar unknown species.

C. Optical Principles and Optical System Configuration

When an anisotropic mineral such as the aragonite or calcite in larval bivalve shells is put between crossed polarization filters, the resulting vivid colors produced are called interference colors and are produced as a consequence of light being split into two rays on passing through the mineral. In calcite, atoms are packed tightest along the X axis compared to the Y axis, and least along the Z axis. The strength of the electric field produced at the atomic level, therefore, is greatest along the X axis and minimal along the Z axis. Unpolarized light interacts with the electric fields causing alignment along the most intense and least intense planes, which are at right angles to each other resulting in two light rays vibrating at right angles, and each with a specific velocity. Because the rays are traveling at different velocities, the fast ray exits the crystal before the slow ray. The phase distance the slow ray lags behind the fast ray is called retardation R. Retardation depends on the thickness of the crystal (d) and the velocity difference between the rays. The index of refraction (n) for each ray is the ratio of the speed of light in a vacuum (V) to the speed of the fast (Vf) or slow (Vs) ray. The retardation then, becomes $R=d(V/Vs-V/Vf)$, or simply $d(ns-nf)$. Since this crystal has two refractive indices, one for each ray, it is called bi-refringent (B), with the maximum magnitude of B being ns-nf, which is characteristic of the mineral.

As the two rays exit the crystal and encounter the second polarization filter set 90 degrees to the first, the result is dependent on the phase angle between the two rays and the resultant vector. Two rays in phase but at right angles will destructively interfere to cause darkness when the resultant vector is aligned 90 degrees to the polarization direction of the second polarizer. When the resultant vector is parallel to the direction of polarization, light is transmitted. This is what causes the dark cross at right angles.

Interference colors are produced by the difference in phase of the slow and fast rays as they destructively and constructively interfere when polychromatic light is used as an excitation source. Because the wavelength of each color is inherently different, some will reach the second polarizer in phase, and cancel, while others will be out of phase and be transmitted.

A novel use of a full wavelength retardation plate is to insert it between the crystal and the second polarizer. This retards the slow ray by another full wavelength relative to the fast ray thus accentuating the phase difference and color intensity.

This is where the crystal orientation in the shell or other mineral under examination becomes important. In bivalve shells, the aragonitic crystals are arranged radially around a central node extending to the ventral margin of the shell. As the fast and slow rays pass from each crystal, they will have a specific orientation relative to the full order wave plate and second polarizer. Those of similar orientation will produce a similar color. The change from one color to another around the shell indicates the crystals are rotated relative to one another. The degree of crystal axis rotation is based on the crystal thickness and the spatial rate of change of color. In the past, this was done by looking up the color in a text book using what's called an interference chart. Comparing colors produced by the object and the chart allowed the birefringence to be estimated relative to the first, second or third order color pattern. The table provides a qualitative way to infer order, but is usually very difficult to implement correctly and often inaccurate.

The optical path (FIG. 1) for the polarized imaging system in the small flow cell allows for clear bi-refringent images of crystalline forms. Broad spectrum light from the Xenon strobe is transmitted through a polarizer and then a condenser to produce polarized Koehler illumination. As the plane polarized light passes through the birefringent material of the larval shell, it is broken into orthogonal slow and fast rays. The rays are collected and magnified by the objective lens then passing through a full wave compensation plate. The latter acts to retard the wave speed of the slow ray by one wavelength thereby accentuating the speed difference between the fast and slow rays and ultimately the brightness of the interference colors (see below). The analyzer is the second polarizer in the path but rotated 90 degrees to the first. The result is that the vector sum of the slow and fast rays will be excluded when it is in plane with either the polarizer or the analyzer, thus producing a dark cross. A quarter wave retardation plate is inserted into the path between the full wave plate and the analyzer which circularly polarizes the light and removes the dark cross. An ocular forms a virtual image and projects this onto the faceplate of a CCD chip to complete the optical path.

Figure 3:
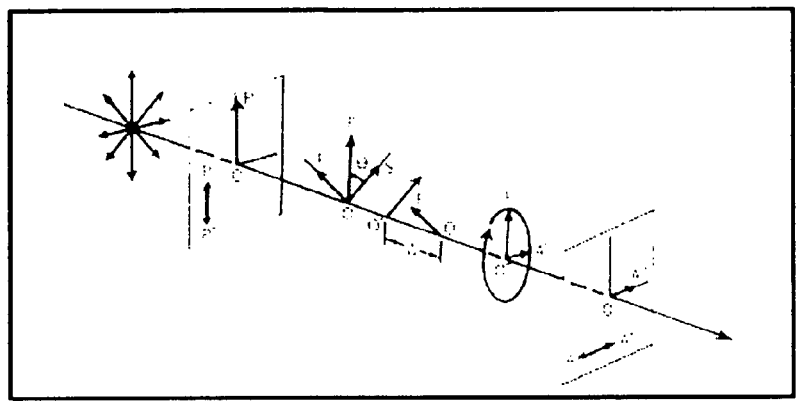
FIGS. 3A-3B shows two color photographs of a bay scallop larval shell. The photograph on the left (FIG. 3A) is taken under transmitted light. The photograph on the right (FIG. 3B) is taken under polarized light using a full wave compensation plate, a plane polarizer analyser and a quarter wave retardation plate in the optical path.
Figure 3:

FIG. 1 shows a schematic of the optical path for polarized light imaging of high-order refractive indices sample materials. On the bottom of FIG. 3, the two larvae images of the same larval shell of the Bay scallop *Argopecten irradians*) but photographed under transmitted light (left) and polarized light (right) using the unique configuration of a full wave compensation plate, a linear polarizer analyzer, and a ¼ wave retardation plate in the optical path. It is important to note that the order of placement of these three optical components (as shown in FIG. 1) is critical to producing useful interference pattern images for analysis and classification of the high-order refractive indices samples identified by the innovative method of the present invention. The polarized light image on the right shows a defined color interference pattern in each 90 degree quadrant. As discussed below, it is this color pattern that is specific to each species of bivalve larvae and is used to make identifications.

A high speed xenon strobe is synchronized with a digital camera such that the strobe discharge occurs at the top of the raster scan. Broad spectrum light is transmitted through a polarizer and then a condenser to produce polarized Koehler illumination. As the plane polarizer light passes through the birefringent material, it is broken into orthogonal slow and fast rays.

The optical path for the polarized imaging system in the small flow cell allows for clear bi-refringent images of crystalline forms (FIG. 3A). Broad spectrum light from the Xenon strobe is transmitted through a polarizer and then a condenser to produce polarized Koehler illumination. As the plane polarized light passes through the birefringent material of the larval shell, it is broken into orthogonal slow and fast rays. The rays are collected and magnified by the objective lens then passing through a full wave compensation plate. The latter acts to retard the wave speed of the slow ray by one wavelength thereby accentuating the speed difference between the fast and slow rays and ultimately the brightness of the interference colors (see below). The analyzer is the second polarizer in the path but rotated 90 degrees to the first. The result is that the vector sum of the slow and fast rays will be excluded when it is in plane with either the polarizer or the analyzer, thus producing a dark cross. A quarter wave retardation plate is inserted into the path between the full wave plate and the analyzer which circularly polarizes the light and removes the dark cross. An ocular forms a virtual image and projects this onto the faceplate of a CCD chip to complete the optical path.

D. Sample Imaging System

The sample imaging system is (FIG. 4) is a flow through sample processor designed to automatically process and identify live or preserved bivalve larvae or plankton samples. Freshly collected samples may be added to the sample container and processed directly. Preserved samples should be rinsed on a screen prior to processing. A sample is introduced into the conical sample container and combined with a continuous stream of filtered seawater to maintain constant head pressure in the sample container (see FIG. 5). Flow rate through the flow cell is controlled by the relative position of the conical vessel and the outflow port, and the pump speed. A stream of filtered seawater acts as a sheath fluid and flows around the sample being injected to focus and orient plankton in the image window. The 1×1 cm imaging window provides a 1 cm depth of field allowing 1 ml of sample to be imaged per frame. At 30 fps this allows a 1.8 L sample to be processed per minute. Images are processed by a computer to provide real-time display of sample images and sample statistics. Images may be processed manually or in real-time, for examply by Visual Plankton for identification of plankton to taxon. The imaging system is self contained and portable to allow transfer from desk top to shipboard operations easily.

Figure 4:
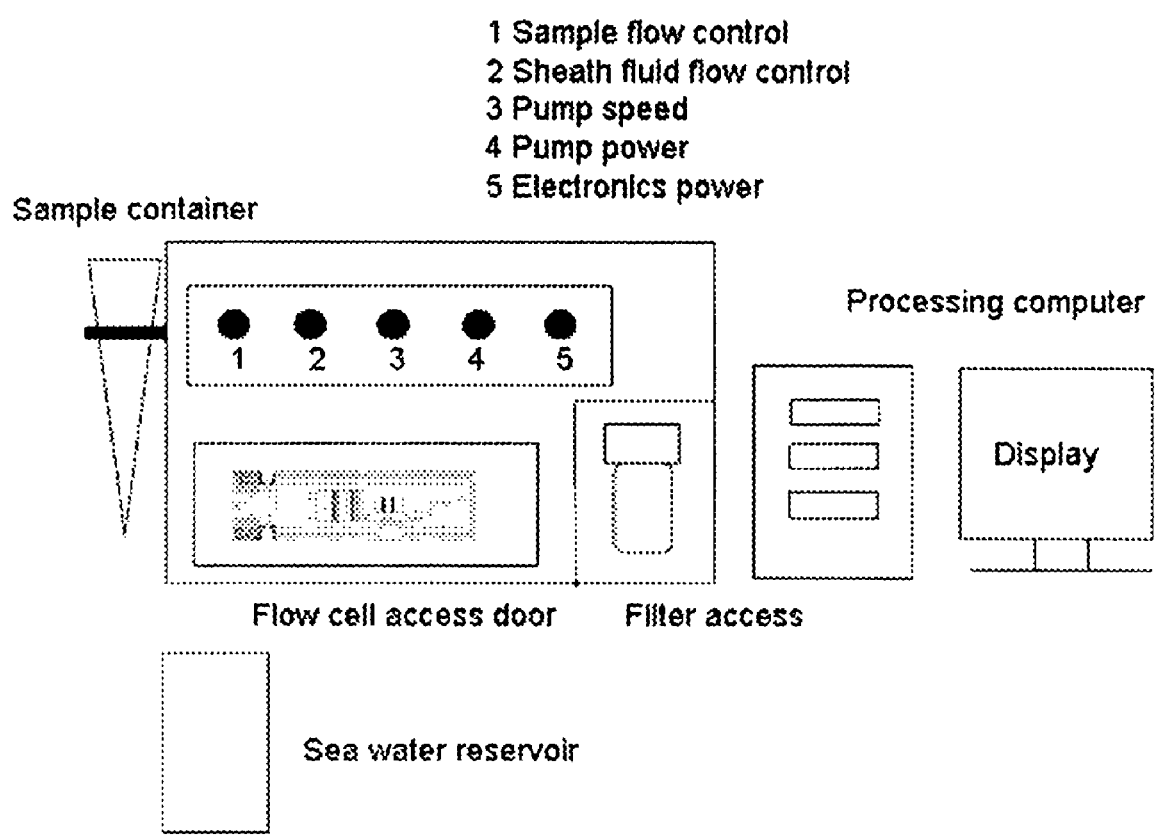
FIG. 4 is a schematic of one embodiment of the imaging system of the present invention which shows a control module, liquid reservoir, sample container, sample flow cell, illumination and light receiving modules, CCD camera and processing computer and display.
Figure 5:
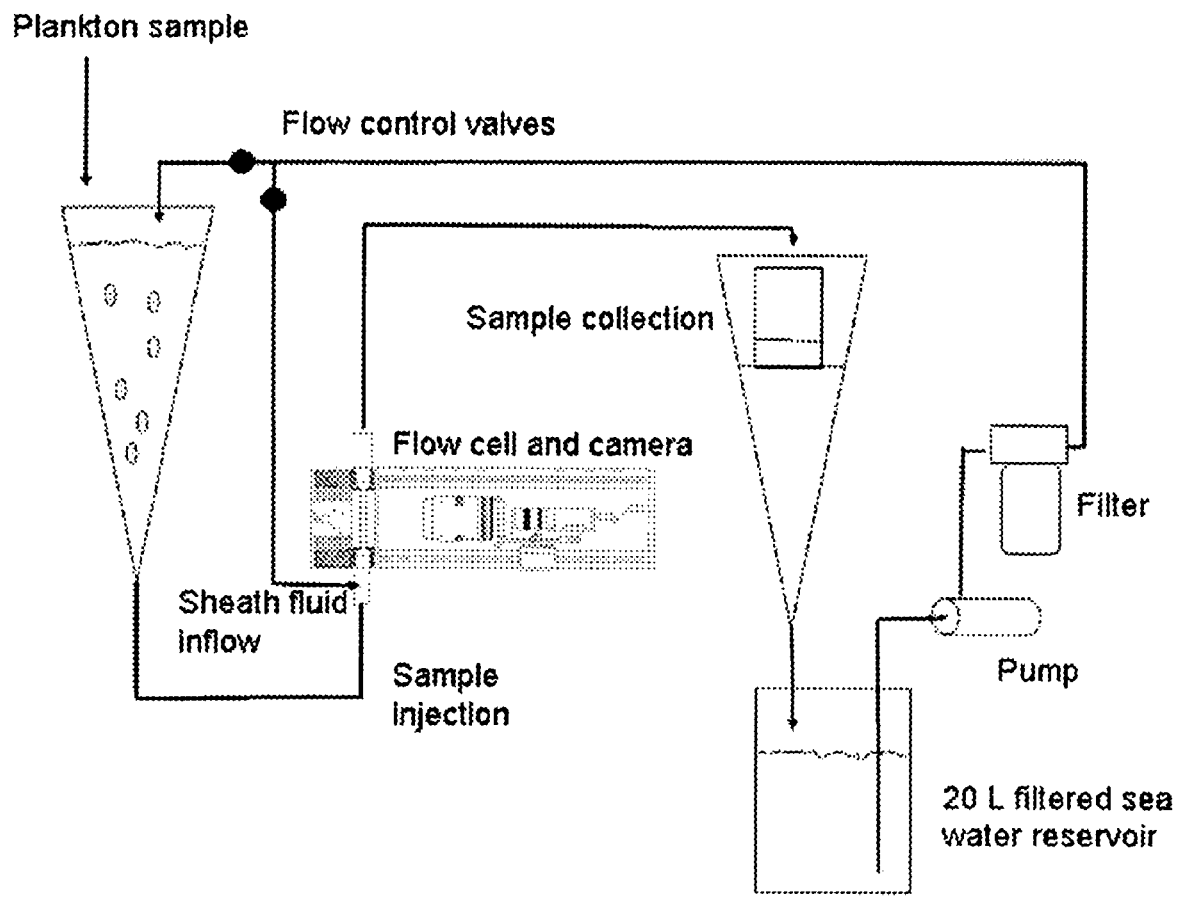
FIG. 5 is a schematic of one embodiment of a flow-through sample processor of the present invention.

FIG. 4 is a schematic diagram of one imaging system embodiment packaged in a self contained box with access to the filter and flow cell/camera, and pump assemblies. The sample container and collection system (see FIG. 5) are mounted on the left side of the package. The sea water reservoir is a separate container. With exception of the reservoir and PC, the system occupies a footprint of 30×60 cm.

The sample flow cell (FIG. 5 and FIG. 6) is machined from a block of delrin and provides 2×2 cm cross sectional area. Windows on either side of the flow cell are polished glass and may be replaced if scratched. Filtered sea water is streamed into the flow cell at a rate of 30 mL per second. The sample is injected into the sheath core (1 cm$^2$) to provide a defined sample volume of 1 mL. The sheath and sample combine and exit the flow cell after imaging.

Figure 6:
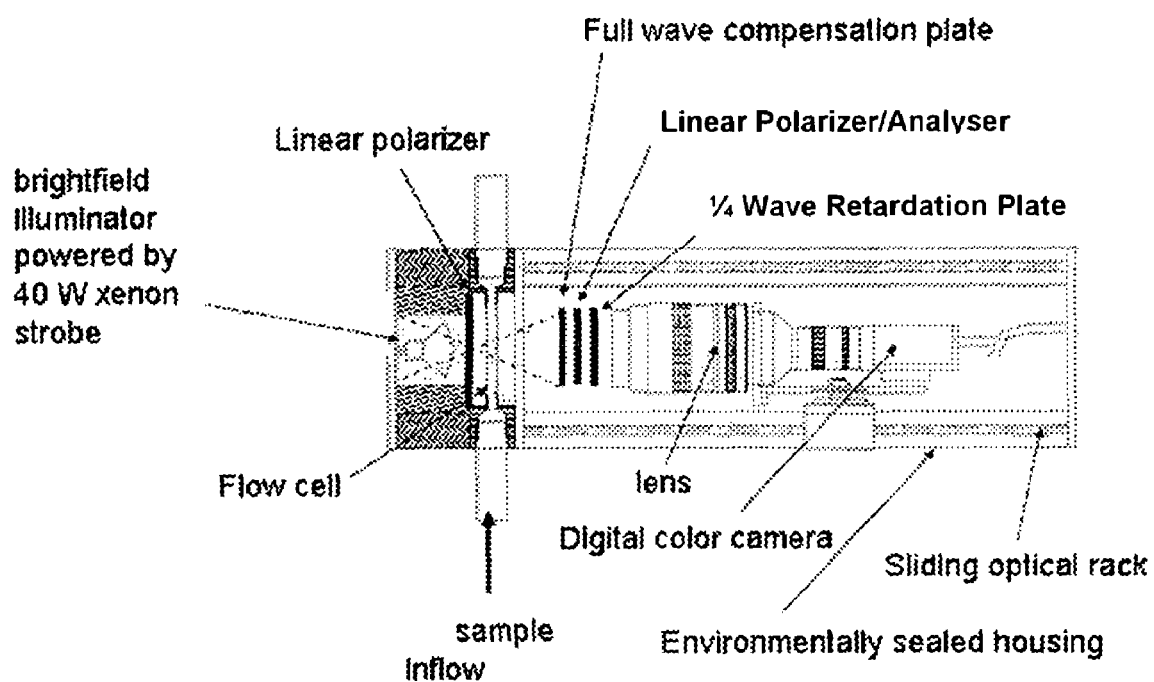
FIG. 6 is a schematic of one embodiment of a sample illumination module, a light receiving module and a digital CCD camera of the present invention.

With reference to FIG. 6, a fiber optic darkfield illuminator ring is illuminated by a 40 Ws high speed strobe providing ~2 microsecond exposures synchronized with the camera frame rate. The Nikon macro lens is focused on the center of the flow cell so the images produced are bright targets against a dark background. The digital monochrome 1.4 Mpixel Hitachi camera opertates at 30 frames per second and has a camera link output for interfacing with the processing computer. The entire camera/lens assembly slides relative to the flow cell for precise focus control. This configuration results in a spatial resolution of 8 µm per camera pixel.

A fresh sample collected with a net may be processed directly by addition to the conical sample container. A sample preserved with formalin or alcohol should be rinsed with filtered sea water before processing to reduce build up of preservative in the reservoir. After addition of the sample to the 2 L conical container, plankton concentration should not exceed about 1/mL so that the total number of plankton processed in a given sample should be about 2000. This minimizes overlap between individuals and associated underestimation of plankton numbers. The sample flows out of the conical container continuously as it is injected into the flow cell in the center of the sheath fluid. The plankton are imaged as they pass through the image volume, combined with the sheath fluid and flow into a sample collection vessel. The base of the collection vessel is covered with Nitex screen, which allows sea water to pass but retains the plankton. Mesh size depends on the mesh of the net used to collect the plankton sample but 100 µm is typical. The sample may then be re-processed or returned to the sample bottle and preserved. Automation of the processing allows a single sample to be processed in about 3 minutes. The inline cartridge filter is cleaned or replaced periodically to remove debris. Natural or artificial sea water may be used in the 20 L reservoir, which should also be replaced periodically.

Figure 7:
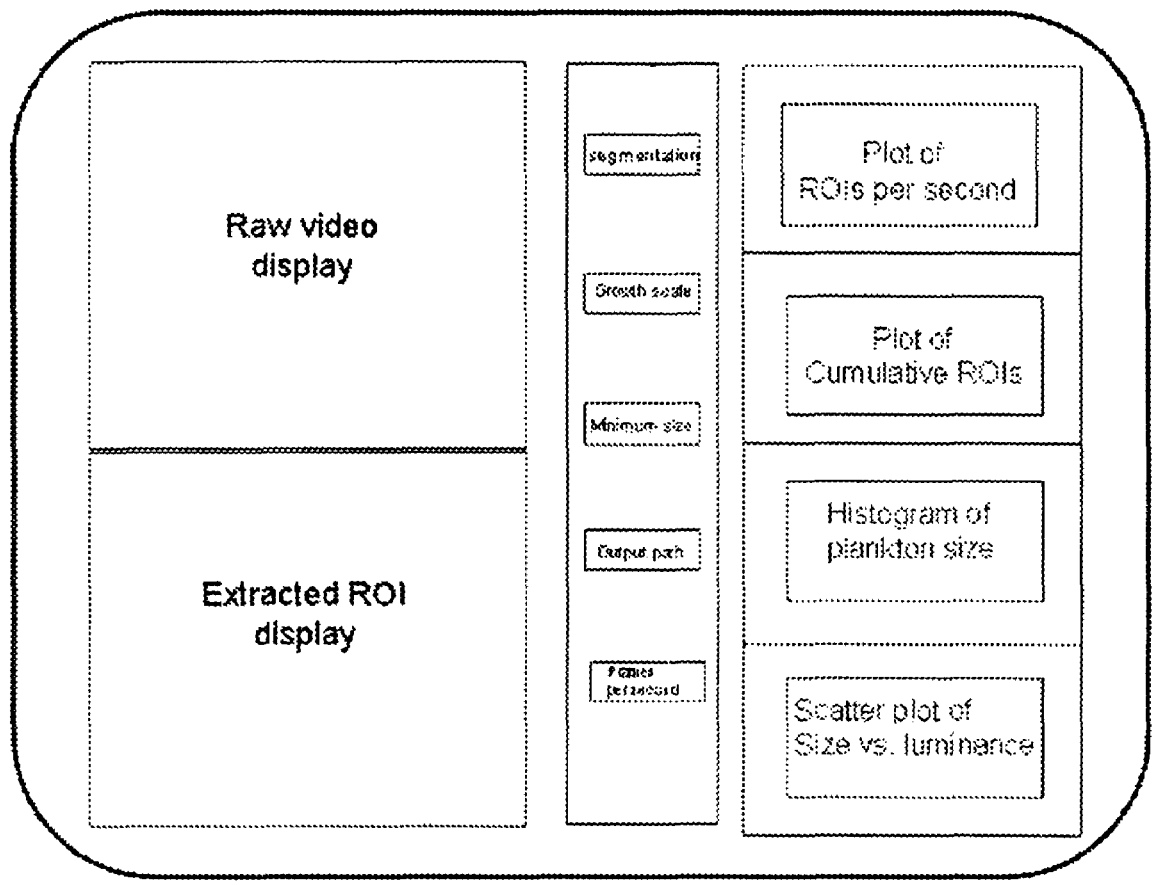
FIG. 7 is a schematic of a typical computer screen display of the image capture software menu options with the present invention.

The processing computer contains a Matrox Meteor II CL frame grabber which accepts the output from the Hitachi camera link interface. Software running on the PC provides a display (see FIG. 7) of the raw images together with extracted Regions Of Interest (ROI). ROIs are identified through a segmentation (binarization) process where the foreground of targets is thresholded against a black background. A bounding box or ROI is drawn around the target and used as a mask to extract the associated pixels from the raw image. The extracted ROI is written to the hard drive along with information on its location and size (total number of pixels). Although the software allows a maximum of 99 ROIs to be extracted in a given image, the actual number rarely exceeds 3 or 4. The segmentation threshold, directory path, and a variety of other parameters are controlled by the operator through a Graphical Users Interface.

In addition to display of video information and operator control through the GUI, the PC also displays a series of plots including 1. ROI extraction rate per second, 2. cumulative ROIs extracted, 3. a frequency histogram of target size distribution as equivalent spherical volume, and 4. a scatter plot of target size versus average luminance intensity. The latter parameter provides a real-time assessment of the number of different kinds of sample species present in the sample and looks much like the output form a flow cytometer.

Following sample processing, extracted ROIs may be passed to a special version of the software package called Visual Plankton (VP). This version of VP allows collection of images to establish a training set and then processing of the entire image set for classification and identification of unknown plankton. Once trained for a particular set of plankton samples, VP can run in the background to classify images while processing samples to display taxon composition following each sample run.

E. Image Analysis and Classification Approach

1. Support Vector Machines

Support Vector Machines (SVMs) have a burgeoning literature: good introduction are [2], [19] and [8]. SVMs have been successfully used in various visual pattern recognition tasks, like object (specially, face) detection and recognition and image retrieval: In [15] and [12] a trainable system for object detection using SVMs is described. In [11] an application to face detection is described; in [18] a view-based object SVM recognition system is described; and in [1], color and luminescence information is exploited for classifications with SVMs.

Gabor functions have a long history of work starting in the 1940s. In [4], both this history and relations to areas of mathematics (especially Weyl-Heisenberg Frames and the Balian-Low Theorem) and applications are all explored. In Texture segmentation, Gabor analysis has been in use since the early 1980s: In [7], a polar, analytic form of a 2-D Gabor wavelet is developed and a multiresolution family of these wavelets is used to compute information-conserving micro and m macro features. In [10], the use of Gabor wavelet features is proposed for content-based image retrieval. In [6], a rotation-invariant texture classification is described using Steerable Pyramids. In [16], another rotation-invariant texture classification method is described which is robust with respect to noisy conditions. Various comparative analyses between different multiscale texture segmentation schemes have been made by: [13] and [17]. In [3], "Iris Code" is constructed by demodulation of the iris pattern.

The color distribution angles are defined in [5] and shown to capture important low-order statistical information about color and edge distributions. The use of color-angle based features in multiscale representation of natural images has been further explored in [21]. The use of HSV (Hue, Saturation, and Value) space to split an image into chromatic and achromatic channels is explored in [9].

Support Vector Machines (SVMs) create a function from a set of labeled training data. The function can be a classification function or a general regression function. SVMs are capable of learning in high dimensional spaces with small training set, which they accomplish by minimizing a bound on the empirical error and the complexity of the classifier at the same time [12]. For binary classification, given a pattern space of inputs, SVMs operate by finding a hypersurface in the space which attempts to split the positive examples from the negative ones. The SVM algorithm formulates the training problem as one that finds, among all possible separating hypersurfaces, the one that maximizes the distance between the closest elements of the two classes (negative and positive). We give a more precise description below.

1. Binary Classification

For a given pattern space, X, suppose we are given labeled training $$T = \{(x_i, y_i)\}_{i=1}^l, x_i \in X, y_i \in Y = \{-1, +1\},$$

Suppose $X \subset R^d$, with the inherited inner product $<,>$. Then, among all hyperplanes H (defined by: $<w,x>+b=0$), separating the data, there exists a unique optimal hyperplane, distinguished by the maximum margin of separation between any training point and the hyperplane. It is the solution of:

$$\underset{w \in H, b \in R}{\text{minimize}} \tau(w) = \frac{1}{2} \|w\|^2$$

(where $1/\|w\|$ is the width of the margin) subject to the inequality constraints:

$$y_i(<w,x_i>+b) \geq 1 \forall i=1, \ldots m. \quad (1)$$

In practice, a separating hyperplane may not exist (for example, because of a high noise level). To allow for the possibility of examples violating (1), one introduces slack variables:

$$\xi_i \geq 0 \forall i=1, \ldots, m. \quad (2)$$

which relax the constraints to:

$$y_i(<w,x_i>+b) \geq 1-\xi_i \forall i=1, \ldots, m. \quad (3)$$

The soft margin classifier is obtained by minimizing the objective function:

$$\tau(w, \xi) = \frac{1}{2}\langle w, w \rangle + C \sum_{i=1}^m \xi_i$$

subject to the constraints (2) and (3). Next, when the pattern space X is not a subset of $R^d$, the SVM constructs a maximal margin linear classifier in a high dimensional feature space, $\Phi(X)$, for a map $\phi: X \to F$, where F is a Hilbert Space with inner product $<.,.>_F$. This is equivalent to the existence of a positive semi-definite kernel function, k(athbfx,x'), defined on X×X, such that:

$$<\Phi(x), \Phi(x')>_F = k(x,x').$$

The function defining the decision hypersurface is given by:

$$f(\vec{x}) = \left\{\sum_{i=1}^l \alpha_i y_i k(x_i, x)\right\} - b. \quad (4)$$

By eliminating the primal variables, w and b, one obtains the dual optimization problem for the soft margin classifier: find optimal coefficients, $\vec{\alpha}$, which maximize the functional, $$W(\vec{\alpha}) = \sum_{i=1}^l \alpha_i - \frac{1}{2} \sum_{i,j=1}^l y_i y_j \alpha_i \alpha_j k(x_i, x_j), \quad (5)$$

subject to the constraints:

$$0 \leq \alpha_i \leq C, i=1, \ldots, l, \quad (6)$$

and $$\sum_{i=1}^l \alpha_i y_i = 0. \quad (7)$$

C is a regularization parameter, controlling a compromise between maximizing the margin and minimizing the number of training set errors.

Let $\vec{\alpha} = (\alpha_1, \alpha_2, \ldots, \alpha_l)$, maximize the objective function given by equation 5. In general only a limited number of Lagrange multipliers, $\vec{\alpha}$, will have non-zero values. The decision surface therefore only depends on a small number of data points with non-zero $\alpha_i$; these data points are called support vectors. For our classification problem, we utilize two kernel functions: The Gaussian Radial Basis Function (RBF) Kernel and the (nonhomogeneous) Polynomial Kernel. The Gaussian RBF kernel is defined by:

$$k(x,x')=e^{-\gamma\|x-x'\|^2}.$$

and the polynomial kernel is defined by:

$$k(x,x')=(<x,x'>+1)^d.$$

The above theory is for binary classification problems. We extend this to multi-class classification in the following manner: Our multi-class scheme uses pairwise classification, i.e. a 6-class classifier is constructed from k=6×5/2=15 two-class classifiers. An input pattern is classified as belonging to the class receiving the largest number of votes.

There are various ways to train SVMs. We use a simple and fast method, the Sequential Minimal Optimization Algorithm (or SMO). Training an SVM requires the solution of a very large quadratic programming optimization problem. SMO breaks this large problem into a series of smallest possible quadratic programming problems i.e. optimizing a minimal subset of just two points at each iteration, which can be solved analytically. We refer to [14] for details.

The Texture Feature Set

The texture feature set is constructed using the Gabor wavelet transforms of the image calculated for a number of scales and orientations. We now describe this in greater detail: A two-dimensional Gabor elementary function, g(x,y), is given by:

$$g(x,y) = \frac{1}{2\pi\sigma_x\sigma_y}\exp[-1/2(x^2/\sigma_x^2 + y^2/\sigma_y^2) + 2\pi i\omega x]$$

Its Fourier transform G(u,v) is given by:

$$G(u,v)=\exp[-\tfrac{1}{2}((u-\omega)^2/\sigma_u^2+v^2/\sigma_v^2)]$$

where $\sigma_u=1/2\pi\sigma_x$ and $\sigma_v=1/2\pi\sigma_y$. Gabor functions form a complete but nonorthogonal basis of $L^2(R)$, the space of square-integrable functions. Gabor wavelets, a class of self-similar functions, are obtained by appropriate dilations and rotations of the mother wavelet g(x,y) through the generating function:

$$g_{mn}(x,y)=a^{-m}g(x',y'), a>1, m,n, \text{integer}$$

$$x'=a^{-m}(x\cos\theta+y\sin\theta) \text{ and } y'=a^{-m}(-x\sin\theta+y\cos\theta))$$

where $\theta=n\pi/K$ and K is the total number of orientations and $a^{-m}$ the scale factor. Since Gabor wavelets are non-orthogonal, the redundancy is reduced by ensuring that the half-peak magnitude support of the filter responses in the frequency distribution touch each other (in a non-overlapping fashion). This condition gives an explicit formula for the filter parameters in terms of the highest and lowest center frequencies, and the total number of scales and orientations (see [10]), in the manner described below.

Let $U_f$ and $L_f$ denote the highest and lowest center frequencies. For scale parameter $\sigma$, the lowest center frequency, $L_f$ is defined to be $1/4\sigma$ cycles per pixel. This value is chosen so that the Gaussian smoothing window size covers at least one cycle of the lowest spatial frequency. In our application the highest center frequency, $U_f$ is set to 0.045 cycles per pixel. Let K be the number of orientations and S be the number of scales in the multiresolution decomposition, then the optimal filter parameters $\sigma_u$ and $\sigma_v$ (and thus $\sigma_x$ and $\sigma_y$) are given by:

$$a = (U_f/L_f)^{-\frac{1}{s-1}}, \sigma_u = \frac{(a-1)U_f}{(a+1)\sqrt{2\log 2}}$$

$$\sigma_v = \tan\left(\frac{\pi}{2k}\right)\left(U_f - 2\log\left(\frac{\sigma_u^2}{U_f}\right)\right)\left(m - \frac{m^2\sigma_u^2}{U_f^2}\right)^{-1/2},$$

where, m=2 log 2. Next, given a gray scale image I(x,y) its Gabor wavelet transform is then defined to be:

$$W_{mn}(x,y)=\int I(x_1,y_1)g_{mn}(x-x_1,y-y_1)dx_1dy_1$$

The mean $\mu_{mn}$ and the standard deviation $\sigma_{mn}$ of the magnitude of the transform coefficients are used to represent the image.

$$\mu_{mn}=\int\int |W_{mn}(xy)|dxdy \text{ and}$$

$$\sigma_{mn}=\sqrt{\int\int(|W_{mn}(x,y)|-\mu_{mn})^2 dxdy}$$

For a color image, one can define similar quantities in both RGB space and HSV (Hue, Saturation, and Value) space. In other words, one can define quantities: $\mu_{mn}^R$, $\mu_{mn}^G$, $\mu_{mn}^B$, $\sigma_{mn}^R$, $\sigma_{mn}^G$, and $\sigma_{mn}^B$ for each of the three RGB color bands and similarly in HSV (Hue, Saturation, and Value) space. We will refer to the first set as RGB Gabor Features and the second as HSV Gabor Features. In the experiments, we found four scales S=4 and eight orientations K=8, to be optimal, resulting in (32×2=64 features for each color channel) a 192 dimensional feature space.

4. Rotation Invariance

Let S be the number of scales and K the number of orientations. Let $\mu_{mn}$ and $\sigma_{mn}$ for m=1, ... ,S and for n=1, ... ,K, be the features defined above. We compute the magnitudes of the Discrete Fourier Transforms of these features to make them rotation invariant. In other words, define rotation-invariant features, $\mu_{mn}^{ROT}$ for m=1, ... ,S and for n=1, ... ,L+1 where, L=[K/2]=the greatest integer less than K/2, as follows:

$$\mu_{mn}^{ROT} = \left|\sum_{k=1}^{K}\mu_{mj}\exp\left(-\frac{i2\pi kn}{K}\right)\right|$$

Since circular translation or rotation does not affect the magnitude of the Fourier Transform (but only the phase), these features are rotation-invariant. Similarly one defines, $\sigma_{nm}^{ROT}$. As above, one defines these features for each of the RGB (or HSV) color channels. The accuracy of these features is dependent on the number of orientations, K. The higher the K, the better the feature set. In section 6, we describe results obtained by chosing K=90, (which makes L=46). Then for S=4, we get 4×46=184 values each for $\mu_{mn}$ and $\sigma_{mn}$ (for each color channel), producing a 184×2×3=1104 dimensional feature space.

5. The Color Feature Set

X. Conventional Color Image Analysis

Since literature in Digital Color Image Analysis is of recent vintage (the last 20 years), there are only a handful of other attempts at formulating indices for the identification of color patterns. One of the first attempts is [Swain and Ballard, 1991]. For a given color image define a color histogram (of 4096 bins). The histogram computes the number of pixels in the image in a give bin of RGB values and uses this histogram of numbers in the identification of an image. The method is thus very different from our SDCI method, which is both more efficient computationally and a much better discriminator. Another color histogram based identification method is described in [Chapelle, O., P. Haffner and V. Vapnik, 1999]. This too uses a color histogram in the SVM-based identification of images from a color images database (the Corel Database). We show in [Tiwari and Gallager, 2003b] that the color histogram is a much poorer discriminator for our image data sets and never gave identification accuracy greater than 70%. In [Lucchese, L, and S. K. Mitra, 2001] describe a color segmentation method based on the application of diffusion processes to chromaticity and lightness information in a color image. This method too is quite different from the SDCI both in its goal (segmentation of the image) and its computation (the use of diffusion processes). Finally, [Wanderly and Fisher, 2003] describe a method based on multiscale colored texture invariants, but their formulation is equivalent to a straight forward application of the methods of [Manjunath and Ma, 1996] and [Finlayson et al, 1996], applied to natural color images.

A. Color Distribution Angles and Color Edge Distribution Angles

3. Conventional Color Feature Methods

The color features are constructed from the color distribution angles and the color edge distribution angles of [5], which are defined as follows: Let the color image I be represented as an M×3 matrix, $I=[I_1,I_2,I_3]$, where M is the total number of pixels in the image and $I_1$, $I_2$, $I_3$, the three color channels. Let N be the column normalization function. In other words, $$N(I)=ID_N$$

where the ith diagonal entry of the 3×3 diagonal matrix $D_N$ is equal to the reciprocal of the length of the ith column of I. For the RGB color space, the color distribution angles $\phi_{RGB}(I)=(\phi_{12},\phi_{23},\phi_{31})\in R\times R\times R$, are defined by:

$$\phi_{ij}(I)=\cos^{-1}((N(I)_i,N(I)_j))$$

where, N(I)I denotes the ith column of N(I). By construction, these angles are rotation-invariant.

The color edge map (5) is defined to be the image convolved with the Laplacian of Gaussian, $^2G*I$ in which the usual two-dimensional filter is repicated for each of the three color channels, and where, as before, $\nabla^2 G*I$ is represented as an M×3 matrix. The color edge angles are defined to be:

$$\Phi_{RGB}(\nabla^2 G*I)=\Phi_{12}(\nabla^2 G*I),\Phi_{23}(\nabla^2 G*I),\Phi_{31}(\nabla^2 G*I))$$
.)

The color edge angles encode second order moment information about the color edge distribution and, by construction, are rotation-invariant. In addition to the color angles, we also use three more (rotaion-invariant) numbers $$\Sigma_{RGB}(I)=(\Sigma_{12}(I),\Sigma_{23}(I),\Sigma_{31}(I))$$

defined as follows:

$$\Sigma_{ij}(I)=\sigma(I_i*I_j)$$

where. * denoted term by term multiplication of vectors and $\sigma$ is the standard deviation. For the HSV (Hue, Satuertion and Value) color space, one can similarly define 9 invariants: $\Phi_{HSV}(I)$, $\Phi_{HSV}(\nabla^2 G*I)$ and $\Sigma_{HSV}(I)$.

We should add that a color histogram (used for example in [1] does not work very well on our images. In addition to much increased computation time, the histogram features never resulted in a classification accuacy of over 70%.

4. Innovative Color Feature Methods of Present Invention

A. Standard Deviation Color Indices (SDCIs)

We define two Standard Deviation Color Indices. These are the RGB Standard Deviation Color Index (RGB SDCI) and the HSV Standard Deviation Color Index (HSV SDCI).

RGB Standard Deviation Color Index (RGB SCDI)

Definition: It is well known that every color digital image is completely described by its 3 color channels R, G, and B, (which list the red, green, and blue intensities, respectively, for all the pixels in the image). We define the RGB Standard Deviation Color Index (SDCI) as follows: each color channel in the image is first normalized; in other words, the intensities of three colors, red, green, and blue are rescaled relative to their range of values. Next, for each pair of color channels, say R and G, the pixel-wise product (of R and G) is computed. This pixel-wise product can be represented as a gray-scale image—the RG pixel-wise product image—whose intensity at each pixel value is the product of the R and the G values at that pixel in the original color image. The SDCI is defined to be the standard deviation of this pixel-wise product image. The SDCI for R and G, thus, measures the variation in the product of two colors R and G throughout the image. The SDCI is similarly defined for the pairs (R,B) and (G,B).

HSV Standard Deviation Color Index (HSV SDCI)

Background: The HSV color model describes color in terms of its hue (H), saturation (S), and value (V). The hue (H) of a sample of uniform color refers to the dominant wavelength of the sample color; more intuitively, it refers to the quality of pure color in the sample that we describe with words like red, purple, blue, yellow, etc. Saturation (S) describes the dominance of hue in the sample color. Quantitatively, it is the ratio of the dominant wavelength to the other wavelengths present in the sample color. White light, for example, contains an even balance of all wavelengths. When saturation is full, we get pure hue; when there is no saturation, the image is desaturated or gray-scale. The value (V), sometimes also called brightness, refers to the intensity or strength of the sample color. Thus a fully desaturated (or gray-scale) image ranges in value (V) between 0 (black) and 1 (white).

Definition: For a given color image, three vectors: H, S, and V, are first defined; these vectors are of length N×M (where N×M is the size of the image), and they are composed of the hue, saturation, and value (respectively) of each pixel in the image. Next, the vectors are normalized; in other words, the hue, saturation, and value vectors are rescaled relative to their range of values. Then, for each pair of vectors, say H and S, the pixel-wise product (of the normalized H and S) is computed. This pixel-wise product can be represented as a gray-scale image—the HS pixel-wise product image—whose intensity at each pixel value is the product of the normalized hue (H) and the normalized saturation (S) at that pixel in the original color image. The HSV SDCI is defined to be the standard deviation of this HS pixel-wise product image. The HSV SDCI for H and S, thus, measures the variation in the product of hue and saturation throughout the image. The SDCI is similarly defined for the pairs (H,V) and (S,V).

Intuitive Explanation of the SDCIs

The pixel-wise product image defined above can be thought of as a kind of correlation matrix between the relevant color channels or HSV vectors. (Note: It differs from the statistical correlation, which is defined as the expected value of the product and, thus, involves averaging the entries of the matrix.) The Standard Deviation Color Index measures the variation in this correlation matrix. Thus, in the RGB color system, for any pair of colors chosen from R (red), G (green), and B (blue), the SDCI measures the variation in the mixing of these colors throughout the image. Similarly, in the HSV color system, the SDCI measures the variation in the local correlation (thought of as entries in the correlation matrix) between either the hue (H) and the saturation (S), or H and value (V), or S and V. The local correlation of any pair of above variables provides us with a measure of how the two variables affect one another (or depend on each other), and the SDCI measures the variation in this dependence.

Z. Comparison of SDCIs with Finlayson's Color Angles.

In "Colour Angular Indexing," by Finlayson et al 1996, the authors describe a method of extracting six numbers from a color digital (or digitized) image for the purpose of rapidly distinguishing the image from other color images in a collection. The 6 numbers consist of 3 color distribution angles, and 3 color-edge distribution angles. Finlayson et al define their color distribution angles for the pairs RG, RB, and GB. The angles are defined as follows: each color channel in the image is first normalized; in other words, the intensities of three colors, red, green, and blue are rescaled relative to their range of values. Next, for a given pair, say, RG, the color angle is defined to be the inverse cosine (or, arc cosine) of the inner product (or dot product) of the R and G values in the image (where the inner product is the sum of the pixel-wise product of the R and G values computed for the entire image). The color angle ranges in value between 0 and pi/2, with the 0-value indicating the highest degree of mixing of the two colors throughout the image and the pi/2-value indicating the lack of any mixing. Intuitively, if at any pixel, the red and green components have high intensity, the corresponding product of the two intensities is high; if this happens throughout the image, then the product-sum is close in value to 1 and, consequently, its inverse cosine is close in value to zero. Similarly, it can be easily seen that when there is little mixing, the product-sum is close in value to 0 and, consequently, the inverse cosine is close in value to pi/2. Thus, Finlayson et al's color distribution angles compute three numbers describing the mixing of the three colors, red, green, and blue, in a color image.

Comparison: Finlayson et al's color distribution angles give a gross measure the mixing of the three basic colors, red, green, and blue, in a color image and, consequently, give numbers that are useful in the rapid identification of color images; however, the numbers (while quick to compute) are not useful when the color images have subtle differences. This is especially true in the case of images of related biological organisms, where a good pattern recognition system is expected to differentiate between images that do not have gross differences between them. Another, example requiring such nuanced recognition is an iris recognition system designed to identify (or distinguish) between images of irises of different individuals. Our Standard Deviation Color Index (SDCI) differs from the color distribution angles in two important regards: a) the SDCI is a much subtler (or more nuanced) measure of color mixing in an image and b) SDCI is defined for the HSV color system, where it proves to be an even finer discriminator of color images. In our application, both the RGB and the HSV Standard Deviation Color Indices were used in the identification of images of 6 species of bivalve larvae. The 6 species consisted of *Argopecten irradians* (Bay Scallop), *Crassostrea Viginica* (American Oyster), *Mercenaria mercenaria* (Hard-shelled clam), *Mya arenaria* (Sand gaper), *Placopecten magellanicus* (Sea Scallop) and *Spisula solidissima* (Atlantic surf Clam). Our images were so alike that trained marine biologists could not identify them with greater than 50% accuracy. In our paper, Tiwari and Gallager, 1996 b, we designed a pattern recognition classifier that identified these images with over 90% accuracy when the images are presented in a vertical orientation (as a result of preprocessing) and over 80% accuracy when the images are presented in random orientations. In this pattern recognition classifier both the RGB SDCI and the HSV SDCI (but especially the latter) played an important role. Without them the pattern recognition system performed at less than 80% accuracy of vertically presented images and less than 70% accuracy for randomly presented images. Thus, the SDCIs were able to boost the accuracy of the classifier by over 10%, which is usually difficult to do when performance accuracy is in the range of 70% to 80%. It is our contention that the SDCIs will prove to be important identifiers of color images, especially as pattern recognition systems are increasingly required to distinguish between ever more similar images, a trend which is expected to continue in the foreseeable future.

5. Implementation

Recall that the Leave-One-Out (LOO) Cross-Validation is obtained by training a classifier k times (where k is the sample size of the feature vectors), each time leaving out one of the feature vectors from training and using only that omitted vector for classification. The various LOO cross-validation error rates for different sets of features are described below. The feature sets were first calculated for 60 vertically oriented images (see first image in FIGS. 1-6) of each of six bivalve species described in Section 1.2.

Although a number of choices were available for the number of scales, S, and orientations, K, and the settings for the highest center frequency, $U_f$, and lowest center frequency, $L_f$, we found that S=4, K=8, $U_f$=0.045 cycles/pixel and $L_f$=0.0065 cycles/pixel were the best settings; we found that if we chose the center frequencies of our Gabor wavelets to be low, we obtained better features for classifying all six species. The table 1 describes various choices of $L_f$, $U_f$, S, and K, and the resulting LOO percentage errors. (The SVM used the Gaussian RBF Kernel with $\gamma$=5 and the regularization parameter C=100.) The parameter, $\gamma$, we use is fairly large; in other words the resulting model is sensitive to small changes in inputs (i.e. a very non-linear mapping).

TABLE 1

The L-O-Out % error rates for different values of the lowest center frequency, $L_f$ (cycles/pixel); highest center frequency, $U_f$ (cycles/pixel); number of scales, S; and number of orientations, K. Gaussian RBF Kernel with $\gamma$ = 5 and C = 100.

All six species

| $L_f$ | $U_f$ | S | K | LOO % Error |
|---|---|---|---|---|
| 0.0065 | 0.045 | 4 | 8 | 16.71 |
| 0.006 | 0.045 | 8 | 12 | 21.79 |
| 0.0065 | 0.045 | 5 | 8 | 24.36 |
| 0.005 | 0.1 | 4 | 6 | 33.33 |
| 0.005 | 0.3 | 4 | 6 | 52.14 |

The complete Gabor feature set for vertically oriented images has length 192 (see section 3). With the above optimal settings for the center frequencies we experimented with various parameters for both the Gaussian RBF kernel, $k_{RBF}(x,x')=e^{\gamma\|x-x'\|^2}$, and the Polynomial kernel, $k_{POLY}(x,x')=(<x, x'>+1)^d$. In general, the RBF kernel performed a little better, but not by much. Table 2 gives the leave-one-out percentage error rates for various settings of $\gamma$, C, and d.

TABLE 2

A Comparison of Gaussian RBF and Polynomial Kernels for different values of $\gamma$, C, and d. Feature set is RGB Gabor (no color angles)

| Gaussian Rbf Kernel | | | Polynomial Kernel | |
|---|---|---|---|---|
| $\gamma$ | C | LOO % Error | d | LOO % Error |
| 2.5 | 100.0 | 15.32 | 3 | 16.99 |
| 3.0 | 100.0 | 14.2061 | 4.5 | 15.60 |
| 3.25 | 100.0 | 14.4847 | 5 | 15.04 |
| 4.0 | 100.0 | 15.0418 | 6 | 15.04 |
| 5.0 | 100.0 | 15.5989 | 7 | 15.88 |
| 7.0 | 100.0 | 15.8774 | 10 | 16.43 |

The 9 color angles of the image by themselves did not prove to be good features (see last two rows of Table 3), however when added to the Gabor features set (thereby creating a feature space of dimension 201), they improved the classification accuracy, as the Table 3 indicates. The table is for the RBF kernel (and Gabor settings of S=4, K=8, $U_f$=0.045 cycles/pixel, and $L_f$=0.0065 cycles/pixel).

TABLE 3

The L-O-O % errors for different values of $\gamma$ and C for the feature set of RGB Gabor Features and RGB Color Angles. Kernel = Gaussian RBF

| $\gamma$ | C | LOO % Error |
|---|---|---|
| Gabor and Color Angles | | |
| 3.0 | 100.0 | 15.04 |
| 4.0 | 100.0 | 13.93 |
| 5.0 | 100.0 | 13.09 |
| 6.0 | 100.0 | 13.93 |
| Color Angles Only | | |
| 3.0 | 100.0 | 28.41 |
| 6.0 | 100.0 | 28.41 |

TABLE 4

The leave-one-out percentage errors for different values of $\gamma$ and C for the feature set comprising of HSV Gabor Features and HSV Color Angles. The lowest error rate of 7.52% is for settings $\gamma$ = 2 and C = 70. Kernel = Gaussian RBF
HSV Gabor and HSV Color Angles

| $\gamma$ | C | LOO % Error |
|---|---|---|
| 1 | 70.0 | 10.03 |
| 1 | 80.0 | 9.47 |
| 2 | 60 | 7.79 |
| 2 | 70 | 7.52 |
| 2 | 80 | 8.36 |
| 3 | 60 | 8.91 |
| 3 | 70 | 9.47 |
| 3 | 80 | 9.749 |

TABLE 5

The confusion matrix for classification of 6 species (60 images each), with each image in standard (vertical) orientation. Gaussian RBF Kernel, $\gamma$ = 2.0, C = 70. 1 = *Argopecten*, 2 = *Crassostrea*, 3 = *Mercenaria*, 4 = Mya, 5 = *Placopecten*, and 6 = *Spisula*
The columns are the actual values and the rows the predicted values.
Images in Vertical Orientation

| | 1 | 2 | 3 | 4 | 5 | 6 |
|---|---|---|---|---|---|---|
| 1 | 54 | 0 | 0 | 3 | 3 | 0 |
| 2 | 2 | 58 | 0 | 0 | 0 | 0 |
| 3 | 0 | 0 | 57 | 0 | 0 | 1 |
| 4 | 6 | 0 | 0 | 53 | 1 | 0 |
| 5 | 4 | 0 | 0 | 1 | 55 | 0 |
| 6 | 0 | 0 | 4 | 0 | 0 | 56 |

TABLE 6

The confusion matrix for classification of 6 species (78 images each), with images in random orientations. Gaussian RBF Kernel, $\gamma$ = 2.0, C = 70. 1 = *Argopecten*, 2 = *Crassostrea*, 3 = *Mercenaria*, 4 = Mya, 5 = *Placopecten*, and 6 = *Spisula*. The columns are the actual values and the rows the predicted values. Classification accuracy = 82.26%
Images in Random Orientation

| | 1 | 2 | 3 | 4 | 5 | 6 |
|---|---|---|---|---|---|---|
| 1 | 56 | 0 | 0 | 10 | 4 | 0 |
| 2 | 0 | 76 | 0 | 1 | 0 | 0 |
| 3 | 0 | 0 | 70 | 0 | 2 | 8 |
| 4 | 14 | 1 | 0 | 59 | 13 | 0 |
| 5 | 5 | 0 | 0 | 7 | 55 | 1 |
| 6 | 0 | 0 | 7 | 0 | 1 | 89 |

We next considered both Gabor features and Color Angles in HSV space and this proved to be our best feature set for vertically oriented images, giving the lowest error rate of 7.52%. Table 5 describes the confusion matrix for these features. Finally, we calculated the rotation-invariant features (of dimension 1104, see section 4) in HSV space for images in random orientations. For the same choices, $\gamma$=2.0 and C=70, we obtained a L-O-O accuracy of 82.26%. Table 6 describes that confusion matrix.

All images are resized to the same size in order that age (size) not influence the classification.

7. Support Vector Machine Training and Parameter Optimization

The method of training the Support Vector Machine (SVM) and optimizing the classification accuracy is described below. It is important to not that while the described method employs HSV color space, RGB color space and a combinations of HSV and RGB color space may be employed by the methods taught below:

1) Identify the pattern classes and their number, P, in the pattern recognition problem. Where P can be any number but is typically between 6 and 24 species.

2) For each pattern class, create a image training set of N images, where N can be any number but is typically is greater than or equal to 60, belonging to that class. The more images there are in the training set, the more accurate the eventual classification will be, however, more images will also increase the computation cost of training. The orientation of images may be vertically or horizontally aligned or randomly oriented. The choice of orientation is at the discretion of the operator and generally depends on the degree of complexity and distinguishing features of the images and how difficult the classification problem is. In one embodiment, where bivalve mollusks were sampled, 60 vertically oriented images were employed. In another embodiment, 78 for randomly oriented images bivalve mollusks were employed. Since bivalve larvae could not independently identified from the ocean with accuracy, sample specimens for generating images for the training set were raised in mono-cultures in a laboratory.

3) For each image in each training set, calculate the feature set vector comprising:
  a) The rotation-invariant Gabor features in HSV space. This is explained in greater detail below.
  b) The color-angle and color-edge-angle features in HSV space. This is explained in greater detail below.
  c) The SDCI features in HSV space. This is explained in greater detail below.

4) Create the feature training set by listing vertically in a matrix form the feature vectors in Step 3 for the entire image training set. This matrix will have N×P rows.

5) Run Leave-One-Out (LOO) optimization on the parameters C and gamma γ of the SVM on the feature training set. This is done as follows:
  a) Choose an integer value of C between 5 and 100 and an integer or half-integer value of gamma between 1 and 7. The definitions of C and gamma are provided above where the Support Vector Machine is discussed.
  b) Initialize LOO error to 0.
  c) From the entire training set of N×P feature vectors, remove one feature vector.
  d) Train the SVM on the remaining (N×P−1) feature vectors.
  e) Classify the removed feature vector, using the trained SVM from step d).
  f) If the classification in step e) above is incorrect, increase LOO error by 1.
  g) Repeat steps c) through f) above for each removed feature vector chosen sequentially from the N×P feature vectors in the feature training set.
  h) Define % LOO error where % LOO error equals 100 times the LOO error at the end of step g) divided by N×P.
  i) Repeat steps a) through h) above for each integer value of C between 5 and 100, and each integer or half-integer value of gamma between 1 and 7.

6) Define the optimum value of C and gamma to be the values which minimize the % LOO error in step I) above.

With respect to the above procedure, the Gabor transforms of the texture feature set are calculated either for each of the color channels of the image (R, G, and B) or for the hue, saturation, and value (H, S, V) of the image, for a number of scales (4) and orientations (90). The Gabor transform for each RGB color channel or each H/S/V channel is the same size in pixels as the original color image. The Gabor transforms have been defined by Manjunath et al. [IEEE Trans. Pattern Anal. Machine Intell. 18:837-842 (1996)] for gray-scale images. We have extended this approach for Gabor transforms to color images in the present invention where a feature set consisting of two statistical invariants, mean and standard deviation, for each choice of scale, orientation, and color channel is defined. This produces a total of 360×2×3=2160 numbers. This is an innovation of the present invention over the grey-scale approach used by Manjunath et al.

The Gabor texture set features are made rotation-invariant by using the Fourier Transform magnitude method. This method for rotation-invariance has been previously used in image analysis literature [Haley et al., IEEE Trans. Image Process. 8:256-269 (1999)]. Since, circular translation or rotation does not affect the magnitude of the Fourier Transform (but only the phase), these features are rotation-invariant. The accuracy of these features is dependent on the number of orientations; the higher the number, the better the feature set. In the discussion above on Gabor texture feature sets, we have described results obtained by choosing the number of orientations to be 90 above where we obtain an 184×2×3=1104-dimensional feature space.

In addition, the color-angles and color-edge-angles [see Finlayson et al., "Color Angle Indexing", Proc. 4$^{th}$ Europ. Conf. Computer Vision, vol. 2, pp 12-27 Cambridge, England (1996)], the innovative Standard Deviation RGB and HSV Color Indices of the present invention, as defined.

Support Vector Machines are well documented in the recent literature in pattern recognition. See for example, [Christianini, N. and J. Shawe-Taylor, 2000], [Herbrich, R., 2002], [Osuna, E., R. Freund and F. Girosi, 1997], [Pontil, M. and A. Verri, 1998], and [Scholkopf, B. and A. J. Smola, 2002]. The output of the SVM is a pattern category. The SVM identifies an image as belonging to a particular pattern category.

8. SVM Classification Method

The method of analyzing an unknown sample image set with a trained Support Vector Machine (SVM) and identifying the species with in the sample is as follows is as follows:
1. Identify the new test image.
2. For this test image, calculate the test feature vector consisting of:
  a. The rotation-invariant Gabor features in HSV space. This is explained in greater detail in Notes 1 and 2 above.
  b. The color-angle and color-edge-angle features in HSV space. (Explained in greater detail in Note 3 above.)
  c. The SDCI features in HSV space. (Explained in greater detail in Note 3 above.)
3. Using the optimized parameters C and gamma from the output of the training flowchart above, train the SVM on the entire set of training feature vectors. (There is a total of N×P training feature vectors.)
4. Classify the test feature vector using the trained SVM.

EXAMPLE 1

Using Gabor wavelet filters, color angles may be determine mathematically without a lookup table. The following is the general:
1. Calculate mean values of Gabor transforms in RGB (or HSV) space.
2. Calculate standard deviations of Gabor transforms in RGB (or HSV) space.
3. Calculate 3 color angles, 3 color-edge angles, and 3 standard deviations of dot products of the three color bands (RGB or HSV) for each image.
4. Create the 201 dimensional feature space for vertically oriented images, or 1113 dimensional feature space for randomly oriented images using very low Gabor center frequencies (less than 0.05).
5. Use the feature set of 7. as input for a soft-margin Support Vector Machine (SVM) with Gaussian RBF kernel. Choose Gaussian RBF parameter, gamma, equal to 2.0 and SVM regularization parameter=70.0:
  A Identify plausible species for sample area.
  B. Create a training set using at least 60 images from each species.
  C. Train the SVM using the Sequential Minimization Algorithm (SMO). Classify feature set data.
  D. Display results of classification.

Figure 2:
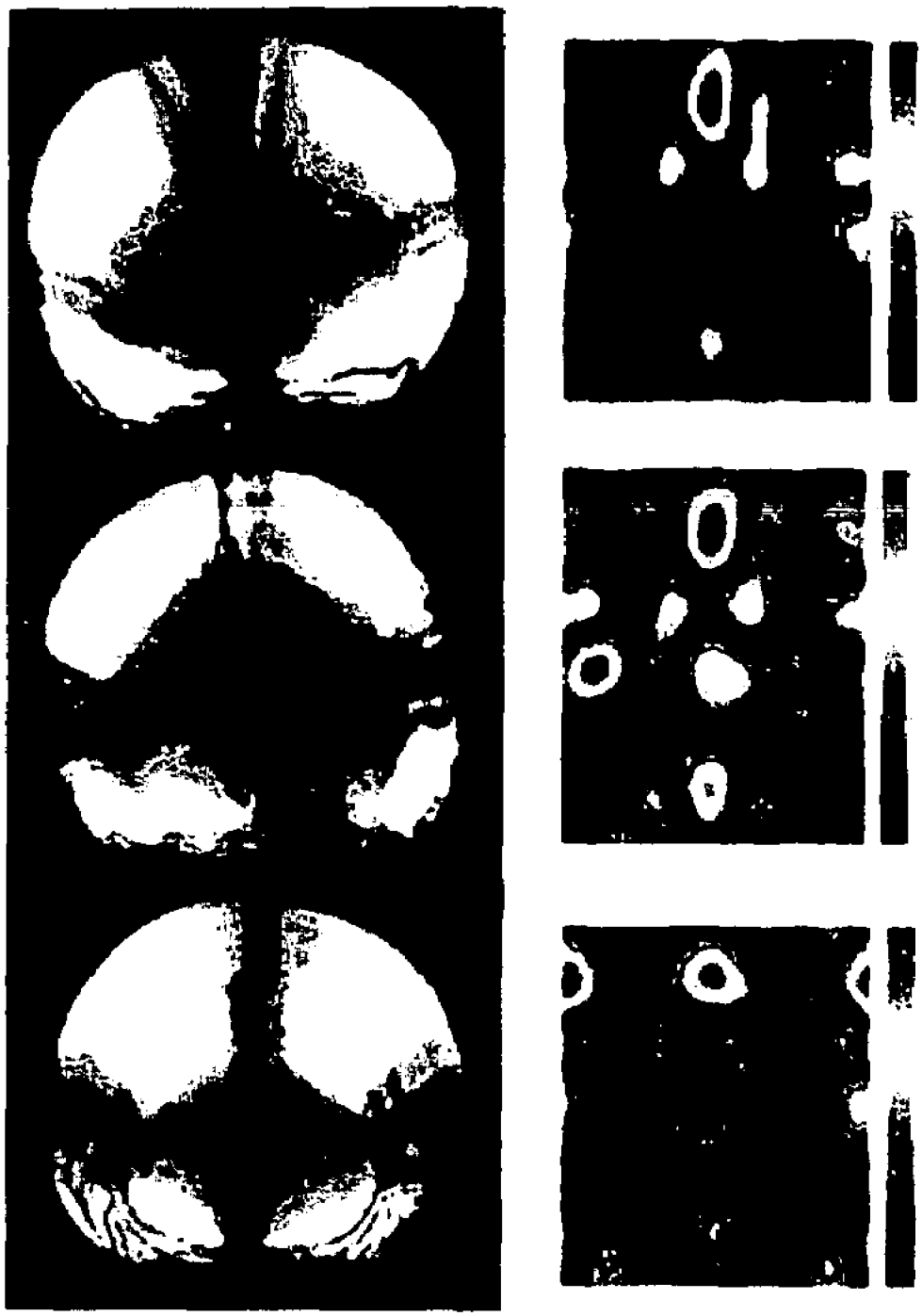
FIG. 2 is a color photograph of a sample images produced by larval shells of three bivalve species, a bay scallop, a sea scallop and a surf clam. The images on the left are the acquired images and the images on the right are a result of convolving a Gabor matrix or filter with the original image.

FIG. 2 shows larval shells of three bivalve species, bay scallop, *Argopecten irradians*, sea scallop, *Placopecten magellanicus* and surf clam *Spisula solidissima*. The pattern to the right of each shell is the result of convolving a Gabor matrix or filter with the original image. The color patterns produced in the transform are specific to each species. A library of six bivalve species has been developed and we are working to increase this to 25. Identifications for the six species (*Argopecten irradians, Crassostrea virginica, Mercenaria mercenaria, Mya arenaria, Placopecten magellanicus*, and *Spisula solidisima*) are 85-95% accurate at this time, but advances in the identification processes should increase to over 95% in the near future.

To identify bivalve larvae, we have devised a scheme using polarized light to produce bi-refringence images of color interference patterns of the larval shells. These patterns are species specific due to the nature of the organic matrix that controls the axial rotation of the aragonitic crystal as the shells are deposited. To classify color interference patterns to species, texture invariants are extracted from Gabor wavelet transforms of each image of a larval shell. The invariant features are used as input to a Support Vector Machine classifier to allow identification of larvae to species with accuracy of 85% or better.

Having described the preferred embodiments of the invention, it will now become apparent to one of skill in the art that other embodiments incorporating the disclosed concepts may be used. Therefore, it is not intended to limit the invention to the disclosed embodiments but rather the invention should be limited only by the spirit and scope of the following claims.

What is claimed is:

1. A flow-through imaging system for capturing images of high order refractive indices samples suspended in a liquid stream comprising:
   a flow-through sample processor comprised of
      a filtered liquid reservoir;
      a sample container comprising
         a sample inlet port for introducing said samples;
         a top inlet port for combining said samples with the filtered liquid received from said reservoir;
         a bottom inlet port for introducing a pressurized gas and a bottom outlet port for transporting the liquid stream of suspended samples to a first flow cell inlet port;
   a sample flow cell for presenting the suspended liquid stream of said samples to a camera focal plane, said flow cell comprising
      an imaging window for filming said samples in said liquid stream;
      said first flow cell inlet port for receiving said suspended sample stream;
      a second flow cell inlet port for introducing a sheath stream of filtered liquid from said reservoir, said sheath stream flowing around said sample stream and orienting said samples in said imaging window for filming;
      a flow cell outlet port for transporting said filmed samples to a sample collector;
   a sample illumination module on a proximal side of said flow cell comprised of
      a brightfield illuminator comprising a xenon strobe light;
      a first linear polarizer for filtering said strobe light; and
      a condenser lens for producing polarized Koehler illumination for illuminating said samples;
   a light receiving module on a distal side of said flow cell comprised of
      an objective lens for collecting and magnifying light transmitted through said high order refractive indices samples;
      a full wave compensation or retardation plate for accentuating a speed difference between a plurality of slow and fast transmitted light rays, said compensation plate accentuating an interference color brightness of said transmitted light;
      a linear polarizer analyzer rotated 90 degrees to said first linear polarizer, said analyzer excluding the vector sum of said slow and fast transmitted light rays;
      a quarter wave retardation or compensation plate for circularly polarizing said transmitted light;
      where said transmitted sample light passes from said objective lens through said full wave compensation plate, through said analyzer and then through said quarter wave retardation plate;
      an ocular for receiving said transmitted sample light from said quarter wave compensation plate, producing a virtual image of said sample transmitted light and projecting said image onto a faceplate of a CCD camera chip; and
   a digital CCD camera for filming a plurality of interference colors produced by said sample transmitted light.

2. A method for training a support vector machine for analyzing and identifying a digitized color image a high order refractive indices samples comprising the steps of:
   identifying the high order refractive indices sample population having P classes of unique species;
   creating a plurality of image training sets for each of said P classes where each training
   set has N images;
   calculating a texture feature set vector for each image of each of said training sets,
   said texture feature set calculation comprising the steps of
      computing Gabor transforms for each of the hue (H), saturation (S) and value (V) channels of each image of said training sets and for S scales and R orientations; and
      calculating statistical invariants comprising a mean and standard deviation for each choice of said scales, said orientations and said HSV channels for each image of said training sets; and
   applying a Fourier Transform magnitude transformation of each of said calculated feature set vectors so as to produce a rotation-invariant feature set;
   calculating a color feature set vector for each image of each of said training sets, set color feature set calculation comprising the steps of
      determining a first zero-delay cross-correlation between color distribution angle pairs for each of said HSV channels;
      determining a second zero-delay cross-correlation between color edge distribution angles for color edge pairs for each of said HSV channels; and
      determining a variance of the zero-delay cross-correlation between HSV standard deviation color index pairs for each of said HSV channels; and
   creating a feature training set matrix for each image training set, said matrix comprised of said texture feature set vectors and said color feature set vectors, said matrix having N×P rows.

3. The method of claim 2 where P=6, N≧60, S=4 and R=90.

4. The method of claim 2 further comprising running a leave-one-out optimization of parameters C and gamma of the support vector machine for a feature training set comprising the steps of:
   choosing an integer value of C between 5 and 100;
   choosing a half integer value of gamma between 1 and 7;
   initializing LOO error to 0;

removing one feature vector from said feature training set matrix;

training said support vector machine on remaining feature vectors of said feature training set matrix;

classifying said removed feature vector with said trained support vector machine;

checking the classification of said classified removed feature vector for error;

determining if said error is present and, if said error is found, increasing said LOO error by 1;

sequentially removing each of said remaining untested feature vectors, one vector at a time, and repeating said removing, said training, said classifying, said checking and said determining steps for each training set of said removed untested feature vectors;

defining a % LOO error as 100 times said LOO error at the end of said sequentially removing step divided by N×P;

repeating all of the above steps for each integer value of C between 5 and 100 and each integer or half-integer value of gamma between 1 and 7; and defining an optimum value of C and gamma which are the values of C and gamma that minimize the % LOO error.

5. The method of claim 4 where P=6, N$\geq$60, S=4 and R=90.

6. A method for classifying a digitized color image of of high order refractive indices samples comprising the steps of:

calculating a texture feature set vector for each image in a set of M digitized images of an unknown sample of of high order refractive indices sample species, said texture feature set calculation comprising the steps of computing Gabor transforms for each of the hue, saturation and value channels of each image of said image set and for S scales and R orientations; and calculating statistical invariants comprising a mean and standard deviation for each choice of said scales, said orientations and said HSV channels for each image of said image set; and applying a Fourier Transform magnitude transformation of each of said calculated feature set vectors so as to produce a rotation-invariant feature set;

calculating a color feature set vector for each image of said image set, said color feature set calculation comprising the steps of determining a first zero-delay cross-correlation between color distribution angle pairs for each of said HSV channels;

determining a second zero-delay cross-correlation between color edge distribution angles for color edge pairs for each of said HSV channels; and determining a variance of zero-delay cross-correlation between HSV standard deviation color index pairs for each of said HSV channels; and creating a feature set vector matrix for said unknown sample image set, said matrix comprised of said texture feature set vectors and said color feature set vectors, said matrix having M rows;

inputing optimized values for C and gamma in a support vector machine;

inputing a training feature set in said support vector machine and training said support vector machine;

inputing said unknown sample feature set matrix in said trained support vector machine and classifying said sample feature set matrix; and providing classified output comprising a set of pattern classes, each sample image associated with a pattern class, said image pattern class identifying each of said sample images.

7. The method of claim 6 where P=6, N$\geq$60, S=4 and R=90.

* * * * *